United States Patent
Hatsuta et al.

[19]

[11] Patent Number: 6,073,996
[45] Date of Patent: Jun. 13, 2000

[54] STRUCTURE OF SEAT BACK WITH ARMREST AND METHOD FOR FORMING THE SAME

[75] Inventors: Susumu Hatsuta; Toshikazu Iwasaki, both of Akishima, Japan

[73] Assignee: Tachi-s Co., Ltd., Tokyo, Japan

[21] Appl. No.: 09/002,022

[22] Filed: Dec. 31, 1997

[51] Int. Cl.⁷ .................................................. A47C 13/00
[52] U.S. Cl. ............... 297/113; 297/411.32; 297/411.46; 156/213; 156/214; 256/46.4; 256/46.6
[58] Field of Search ............................... 297/113, 411.32, 297/411.46; 156/212, 213, 214; 264/46.4, 46.8, 51

[56] References Cited

U.S. PATENT DOCUMENTS

| | | | |
|---|---|---|---|
| 1,105,822 | 8/1914 | Murphy | 297/411.46 X |
| 3,612,606 | 10/1971 | Swenson | 297/411.32 X |
| 4,662,674 | 5/1987 | Shirai et al. | 297/113 |
| 4,756,569 | 7/1988 | Trutter et al. | 297/411.32 X |
| 4,840,430 | 6/1989 | Shimada | 156/212 X |
| 5,108,529 | 4/1992 | Shuert | 156/212 X |
| 5,150,946 | 9/1992 | Marfilius et al. | 297/113 X |
| 5,193,265 | 3/1993 | Muggli et al. | 156/212 X |
| 5,238,513 | 8/1993 | Gill | 156/212 X |
| 5,624,517 | 4/1997 | Giesen et al. | 156/212 |

FOREIGN PATENT DOCUMENTS

| | | | |
|---|---|---|---|
| 3505399 | 8/1986 | Germany | 297/411.32 |
| 3-7757 | 1/1991 | Japan . | |
| 4-4852 | 1/1992 | Japan . | |
| 405069771 | 3/1993 | Japan | 297/411.32 |
| 6-44464 | 6/1994 | Japan . | |

*Primary Examiner*—Peter M. Cuomo
*Assistant Examiner*—David E. Allred
*Attorney, Agent, or Firm*—Browdy and Neimark

[57] ABSTRACT

Forming a structure of seat back with armrest is effected by pressingly adhering a covering material to a foam padding of a predetermined sheet back shape, through a foaming process and an adhering-type stamping process, using a die element having a protuberant die surface part in both of the foaming and adhering-type stamping processes. The protuberant die surface part includes at least two sloped die surfaces. Hence, in operation, the die element can be smoothly removed from a resulting foam padding in which a recessed portion with at least two sloped walls is formed, at the foaming process. Then, the covering material is bonded evenly in such recessed portion and other surrounding area of padding at the adhering-type stamping process. In this way, a resulting structure of seat back is attained, with a recessed armrest storage portion having at least two sloped walls defined therein, which has no floated or wrinkled point therein and allows the armrest to be frictionally retained in the armrest storage portion when in no use.

10 Claims, 3 Drawing Sheets

STRUCTURE OF SEAT BACK WITH ARMREST AND METHOD FOR FORMING THE SAME

BACKGROUND OF INVENTION

1. Field of the Invention

This invention relates to a structure of seat back with armrest for a vehicle or automotive seat which has an armrest storage portion, and a method for forming such seat back structure.

2. Description of Prior Art

Normally, a bench seat and split seat used as a rear seat in an automobile are provided with a movable armrest in the central area thereof, so that the armrest may be moved to a use position for the purpose of supporting arms of passengers sitting on the seat and comforting the passengers in a relaxed posture. For instance, the bench seat typically has a recessed or cut-out region formed centrally of its seat back, which creates an armrest storage portion for allowing the armrest to be stored therein.

Conventionally, to form this kind of seat back with armrest storage portion, it has been a common practice to prepare a covering material including four cut sections defined centrally thereof and a foam padding shaped in a predetermined seat back configuration, the foam padding having a through-hole formed therein. The covering material is merely placed upon the foam padding by anchoring the terminal ends of covering material to a frame or support means in the foam padding. In particular, the afore-said four cut sections of covering material are inserted into the through-hole of padding and anchored via hog rings or the like to an insert wire embedded in the padding around the through-hole, to thereby define an armrest storage portion in the seat back. Then, an armrest is rotatably secured in such armrest storage portion, such that the armrest may be rotated and stored in the armrest storage portion, when not in use.

However, in that conventional method, the anchoring of the covering material has been found defective in creating an undesired plural floated or slacked points and wrinkles in the anchored portions of covering material within the armrest storage portion. Moreover, in the process of forming the foam padding, a foaming die member can not be easily removed from the through-hole of foamed work. That is, during foaming process, the through-hole is formed in the padding by a corresponding shape of projected part of foaming die member, with the result that a close contact between the through-hole and projected part of die member makes removal of the die member from the resulting formed padding difficult.

SUMMARY OF THE INVENTION

In view of the above-stated drawbacks, it is a purpose of the present invention to provide an improved method for forming a structure of seat back having an armrest storage portion therein, which permits for smooth removal of die elements from a resulting formed work forming the seat back and avoids creation of undesired floated or wrinkled points in the armrest storage portion.

To achieve such purpose, in accordance with the present invention, there is basically provided the steps of:

providing a foaming die means including die surfaces conforming to a predetermined configuration of seat back, the die surfaces having a protuberant die surface part, wherein the protuberant die surface part has at least two sloped die surfaces which slope towards each other inwardly of the protuberant die surface part;

injecting a liquid base foaming material into the foaming die means;

curing the liquid base foaming material along the die surfaces of foaming die means to form a foam padding in the predetermined configuration of seat back, so that a recessed portion is defined in one side of the foam padding along that protuberant die surface part in such a manner as to form at least two sloped walls in the recessed portion of foam padding;

taking out the foam padding from said foaming die means;

providing a covering material;

providing an stamping means for adhesively engaging said cover material to said padding including stamping die surfaces conforming to the predetermined configuration of seat back, the die surfaces having a protuberant die surface part, wherein the protuberant die surface part generally conforms to the recessed portion of foam padding and has at least two sloped die surfaces each corresponding to the respective at least two sloped walls of recessed portion of the foam padding;

setting the foam padding in the stamping means;

operating the stamping means to press the stamping die surface thereof against the covering material, thereby causing the covering material to be adhered on and along the recessed portion and other surfaces of foam padding, so as to form an adhered work of the covering material and foam padding which has an armrest storage portion with at least two sloped walls defined therein;

removing the stamping die surface from the adhered work of covering material and foam padding;

taking out the adhered work from the stamping means; and attaching a seat back frame and a bracket into the adhered work, while securing the armrest rotatably via the bracket in the armrest storage portion, whereby a structure of seat back is formed, in which the armrest storage portion opens outwardly in a divergent manner.

Accordingly, the foaming die can be easily and smoothly removed from the foam padding because both divergent side slopes of the protuberant die surface and recessed portion of resulting foam padding effectively provides a smooth slidability therebetween so as to facilitate the ease of removing the protuberant die surface from the recessed portion of padding. Further, the sloped walls of padding are effective in permitting even stretching and adhering of the covering material thereon without the floating or wrinkle problem as found in the prior art.

Another purpose of the present invention is to provide the seat back structure formed by the foregoing method, wherein said armrest storage portion has a flat bottom wall in addition to the at least two sloped walls, which at least two sloped walls diverge outwardly from each other in relation to the flat bottom wall, and further those sloped walls comprise a first sloped wall with which a free end portion of said armrest is to be frictionally contacted and a second sloped wall with which a base end portion of said armrest is frictionally contacted.

In still another aspect of the invention, it is possible to use a covering material of the type having a recessed portion preformed by sewing together a plurality of separate covering material sections in a shape generally conforming to said recessed portion of said foam padding, with plural sewn connecting portions thereof projecting outwardly therefrom. For that purpose, the protuberant die surface part of foaming die means may be formed with plural projections, and therefore, at the foregoing step of curing the liquid base foaming material, a recessed portion may be defined in the foam padding along said protuberant die surface part of said foaming die in a manner as to form the at least two sloped walls in the recessed portion of foam padding and plural slits. Also, the protuberant die surface part of stamping means may be formed with plural projections and thus, at the foregoing step of operating the adhering-type stamping means, the covering material may be adhered on and along the thus-formed recessed portion and other surfaces of foam padding, with the sewn connecting portions of covering material being inserted in the plural slits of said foam padding, so as to form an adhered work of the covering material and foam padding which has an armrest storage portion with at least two sloped walls defined therein. Accordingly, in that way, there may be formed a structure of seat back wherein the armrest storage portion has a flat bottom wall in addition to the at least two sloped walls, with those sloped walls diverging outwardly from each other in relation to the flat bottom wall, and wherein the same sloped walls each comprises a first sloped wall with which a free end portion of the armrest is to be frictionally contacted and a second sloped wall with which a base end portion of the armrest is frictionally contacted.

Other features and advantages of the invention will become apparent from the description hereinafter, with reference to the annexed drawings.

DETAILED DESCRIPTION OF PREFERRED EMBODIMENTS OF THE INVENTION

FIGS. 1 through 7, there are illustrated a seat back structure and processes for forming the same in accordance with the present invention.

Figure 1:
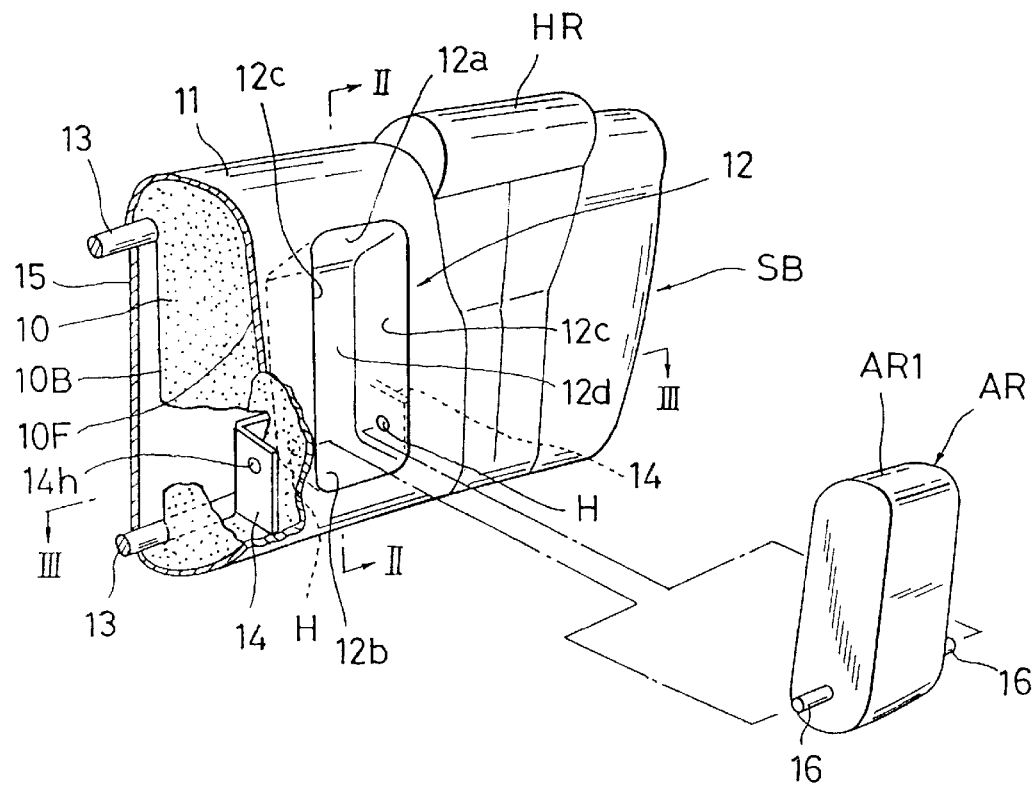
FIG. 1 is a partly exploded schematic perspective of seat back structure in accordance with the present invention.

FIG. 1 shows a partly broken perspective view of a seat back (SB) of a bench-type rear seat for use in an automobile, which has an armrest storage portion (12) formed in the central area thereof. As shown, this seat back (SB) includes a headrest (HR) integral on the right-side top of seat back (SB), and it is understood that the same headrest is formed on the broken-out left side of same seat back (SB) in respect to the the armrest storage portion (12).

Figure 2:
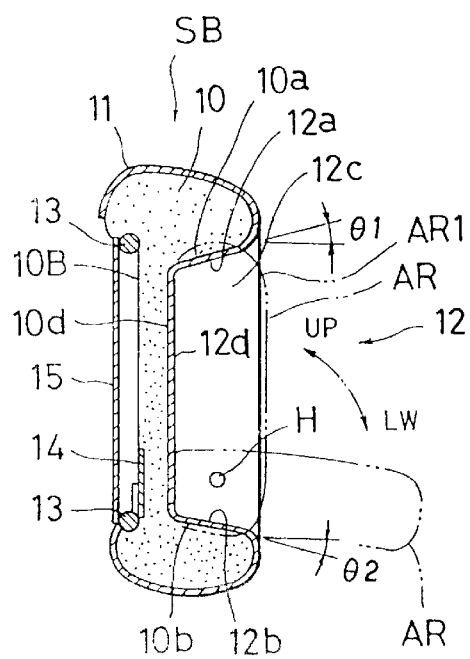
FIG. 2 is a sectional view taken along the line II—II in the FIG. 1.
Figure 3:
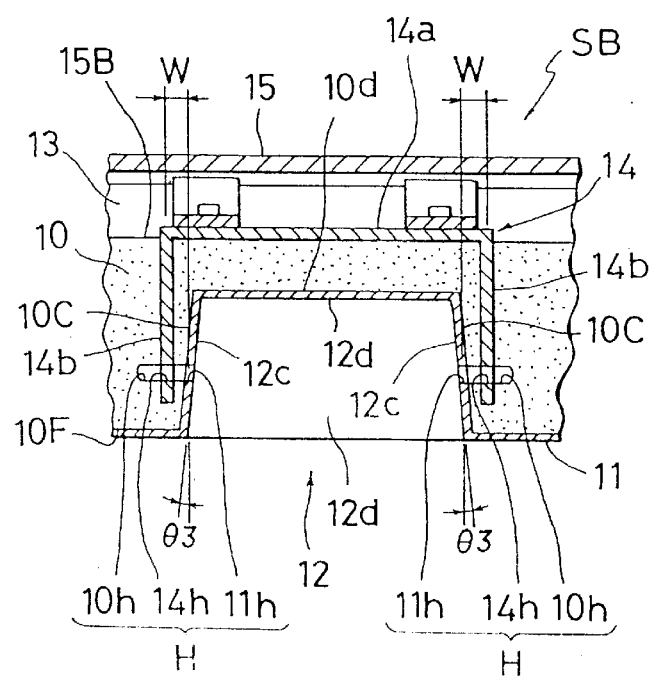
FIG. 3 is a fragmentary sectional view taken along the line III—III in the FIG. 1.

According to one exemplary mode shown in FIGS. 1 to 3, the seat back (SB) is essentially composed of: a foam padding (10) (made of urethane resin) shaped in a predetermined configuration of seat back as can be seen from FIG. 1, wherein an armrest storage recessed area (10a, 10b, 10c, 10d) is defined centrally of the padding (10); a covering material (11) adherently affixed on the frontal side (10F) of padding (10) and also in the armrest storage recessed area of the same padding (10); a seat back frame (13) secured at the back side (10B) of padding (10); and a support bracket (14) fixedly connected to the frame (13) for journally supporting an armrest (AR). A back board (15) is attached at the back side of seat back (SB). Though not shown, the covering material (11) (and other covering material (11') in FIG. 7) is normally a trim cover assembly of three-layer lamination structure comprising a top cover layer, a foam wadding layer and back cloth layer in this order, as used typically in the automotive seats.

With this structure, the seat back (SB) is formed with a recessed armrest storage portion (12) at the center thereof, in which the armrest (AR) may be accommodated when not used.

Specifically, referring again to FIGS. 1 to 3, the armrest storage portion (12) is of a configuration having four sloped walls (12a)(12b)(12c)(12c) and a flat bottom wall (12d). Hence, the storage portion (12) opens in a divergent way in the outward direction from its bottom wall (12d), thus generally assuming a recess of truncated pyramid shape. It is noted that this armrest storage portion (12) becomes smaller in volume as it proceeds toward its bottom wall (12d), reducing its capacity against the whole size of amrest (AR), as understandable from the corresponding solid and two-dot chain lines in FIG. 2, so that the armrest may be frictionally secured in the storage portion (12) due to the elastic force of foam padding (10). More particularly as to the armrest storage portion (12), it is preferred as viewed from FIG. 2 that the upper sloped wall (12a) be of an upward angle ($\theta$1), approx. 15 degrees, relative to a line extending perpendicularly from the flat bottom wall (12d), and by contrast, the lower sloped wall (12b) be of a downward angle ($\theta$2), approx. 10 degrees, relative to a line extending perpendicularly from the flat bottom wall (12d). Also, as viewed from FIG. 3, each of the two lateral sloped walls (12c)(12c) should preferably be of an outward angle ($\theta$3), approx. 5 degrees, relative to a line extending perpendicularly from the flat bottom wall (12d). This is however not limitative, and the foregoing angles ($\theta$1)($\theta$2) may be set at a suitable angle within 7 to 20 degrees, while the other angles ($\theta$3) be suitably set within 5 to 10 degrees, insofar as they realize the gist and features of the present invention within the descriptions hereinbefore and hereinafter.

The support bracket (14), of a generally "U" shape, is fixedly connected at its base securing section (14a) to the seat back frame (13) by means of bolts and other suitable connecting means, as shown. As in FIGS. 1 and 3, a pair of outwardly extending sections (14b)(14b) of this bracket (14) are embedded in the foam padding (10) such as to surround the above-mentioned armrest storage portion (12).

A pair of opposed holes (H)(H) are formed in the lower part of the armrest storage portion (12) for receiving the two shafts (16)(16) of armrest (AR), respectively. As shown in FIG. 3, each hole (H) is established by the following coaxially aligned three holes in the aggregate: a hole (11h) apertured in the covering material (11); a bore (10h) formed in the foam padding (10); and a hole (14h) formed in the outwardly extending section (14b) of bracket (14). Of course, the diameters of these three holes establishing the holes (H) are slightly greater than those of shafts (16) of armrest (AR).

It is noted here that, as understandable from FIG. 3, the trapezoidal cross-section of armrest storage portion (12) should be so smaller in size than the channel cross-section of support bracket (14) as to space the pair of lateral sloped walls (12c) of storage portion (12), a distance (w), from the respective pair of outwardly extending sections (14b) of support bracket (14), wherein the distance (w) allows for giving a proper thickness of foam padding (10) which may be elastically contracted toward the outwardly extending section (14b) of bracket (14) to widen the opening dimension of storage portion (12) to the degree that both shafts (16) of armrest (AR) may be smoothly inserted in the respective two holes (H). In other words, as indicated in FIG. 1, at the final assembling stage where the armrest (AR) is to be secured in the storage portion (12), one shaft (16) of armrest (AM) is first inserted in one of the two holes (H), and then the armrest (AR) is forcibly pressed against one lateral sloped wall (12c) at which such one of two holes (H) lies, whereby the corresponding thickness of padding (10), at (w), is elastically contracted, which in turn gives a space for enabling the other shaft (16) of armrest (AM) to be smoothly inserted into another of two holes (H). In that way, the two shafts (16) of armrest (AM) are rotatably secured in the respective two holes (14h) of support bracket (14). For such purpose, needless to state, the whole length of armrest shaft (16) is properly greater than the width between the two outwardly extending sections (14b) of bracket (14).

As indicated by the two-dot chain line in FIG. 2, the armrest (AR) is rotatable relative to the hole (H) between the upright non-use position within the armrest storage portion (12) and the generally horizontal use position projecting from the storage portion (12). Thus, the armrest (AR) may be rotated upward from the horizontal use position, in the arrow (UP), and pressed with a small force into the storage portion (12), so that the armrest (AR) is frictionally retained therein due to the outward elastic force of padding (10) applied to the four lateral walls of armrest (AR). In such armrest stored case, the upper sloped wall (12a) of armrest storage portion (12) serves to create a clearance in respect to the free end portion (AR1) of armrest (AR), which allows a user to easily grasp that armrest free end portion (AR1) with his or her hand. Therefore, the user can draw and rotate the armrest (AR) downward from the storage portion (12) to the generally horizontal use position in the arrow direction (LW) as indicated by the two-dot chain line in FIG. 2.

Now, referring to FIGS. 4 to 7, a description will be made of a method for forming the above-described seat back (SB) in accordance with the present invention.

Figure 4:
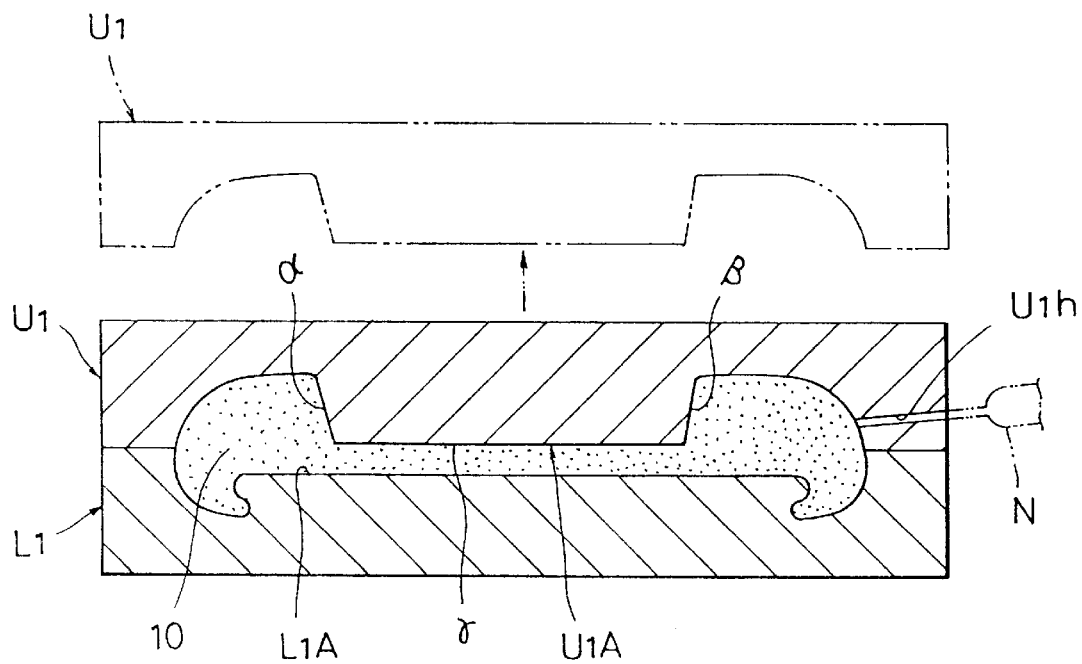
FIG. 4 is a schematic sectional view of a foaming die apparatus, which explanatorily shows foaming processes for foaming foam padding.
Figure 5:
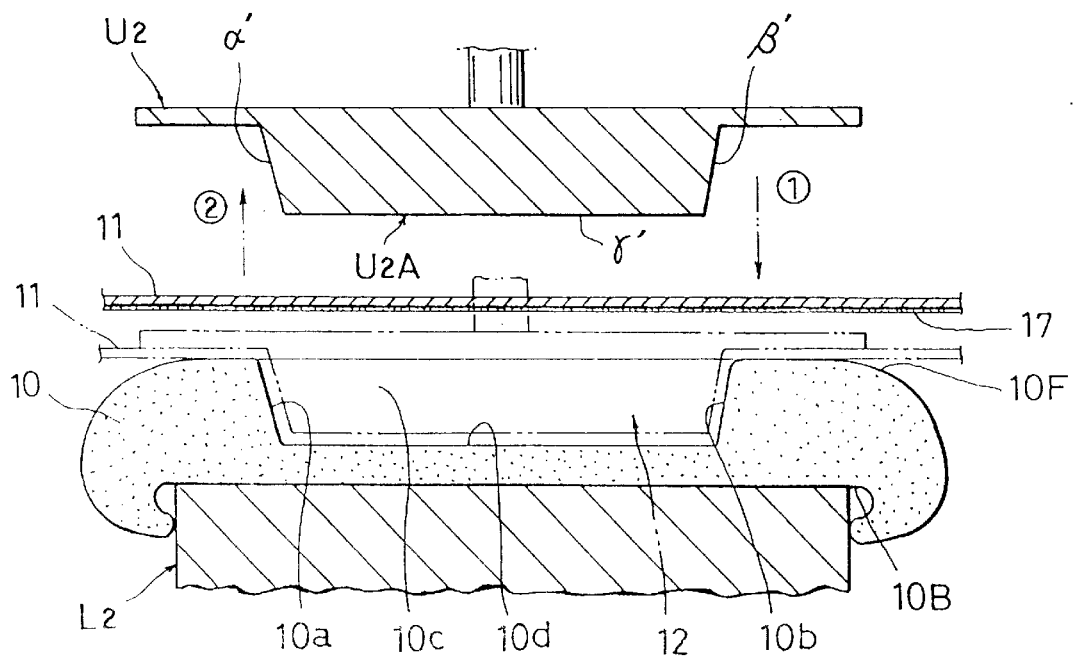
FIG. 5 is a partly broken schematic sectional view of an stamping apparatus, which explanatorily shows the processes for stamping and adhering a covering material to the foam padding formed by the foaming die apparatus.
Figure 6:
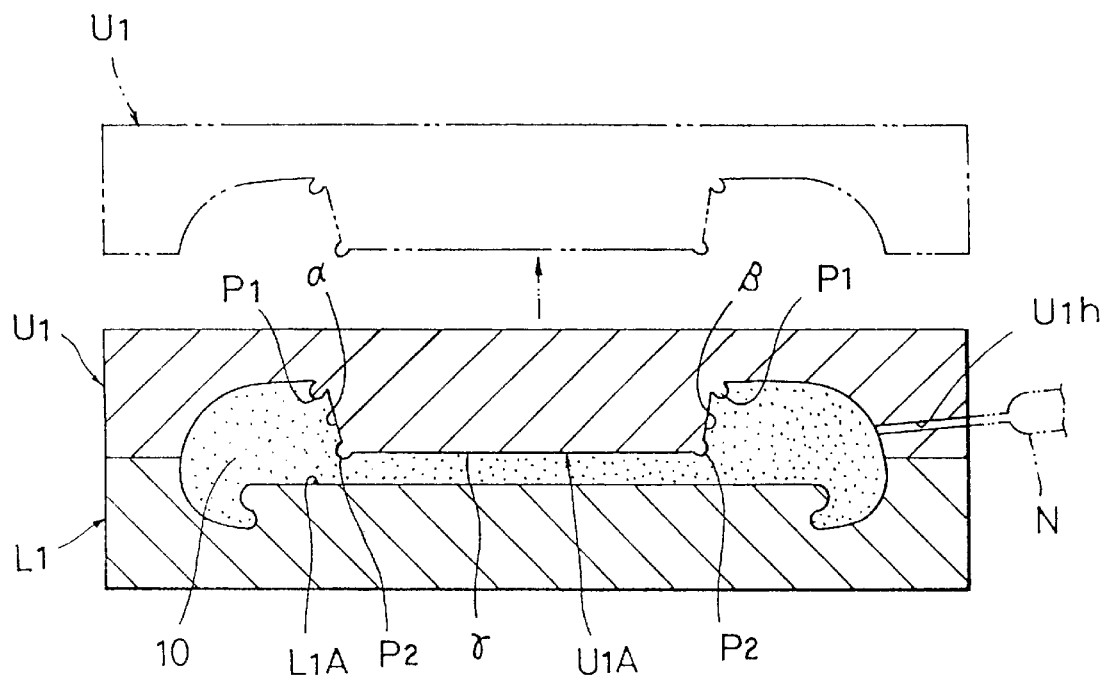
FIG. 6 is a schematic sectional view of other alternative mode of the foaming die apparatus, showing the associated foaming processes explanatorily.
Figure 7:
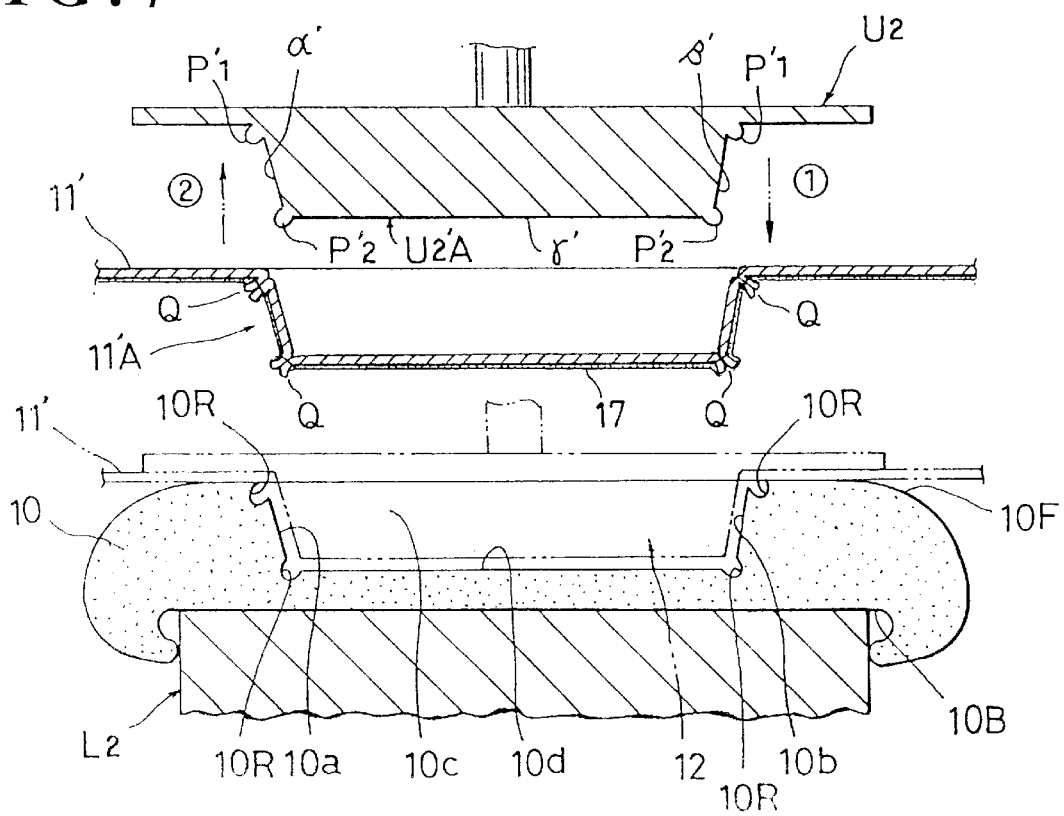
FIG. 7 is a schematic sectional view of other alternative mode of the stamping apparatus, showing the associated stamping/adhering processes, explanatorily.

FIGS. 4 and 5 show one mode of method for forming the seat back (SB), using one unitary sheet of covering material (11), whereas FIGS. 6 and 7 show another alternative mode of method for forming the seat back (SB), using other covering material (11') in which an armrest storage section (11'A) is formed by sewing together a plurality of separate covering sections. However, those two modes are not distinctive from each other, because they are merely intended to show that the present invention is adaptable for using both unitary covering material (11) and such sewn work (11') of separate covering materials, with slight modifications to be explained later, within the gist and scopes of the present invention.

According to the mode shown in FIGS. 4 and 5, a foaming die apparatus including upper and lower foaming dies (U1) (L1) is provided to form the foregoing foam padding (10) in a predetermined configuration of seat back (SB). While not clearly shown, it is observed from FIG. 4 that the upper foaming die (U1) has a working die surface shaped in conformity with the uneven frontal side of seat back (SB). The working die surface has, formed in its central area, a protuberant die surface part (U1A) of a truncated pyramid shape which will correspond generally to the likewise shaped armrest storage portion (12) of resulting seat back (SB) shown in FIG. 1. Hence, the protuberant die surface part (U1A) includes four sloped side die surfaces corresponding to the four sloped walls (12a, 12b, 12c, 12c) of armrest storage portion (12). In FIG. 4, the upper foaming die (U1) is shown to have first and second sloped side die surfaces ($\alpha$)($\beta$) which will form the upper and lower sloped walls (12a)(12b), respectively, and a flat die surface ($\gamma$) which will form the flat bottom wall (12d). Although not shown in FIG. 4, it is to be understood that a third and fourth side die surface both are provided in the upper foaming die (U1) to form the two lateral sloped walls (12c)(12c), respectively. Designation (U1h) denotes an injection hole through which a liquid base foaming material is to be injected from a nozzle (N) into the die. Accordingly, the sloping angles of those sloped walls (12a)(12b)(12c) may be set properly within the above-specified degrees concerning the four sloped walls (10a,10b,10c,10c) of foam padding (10). On the other hand, the lower foaming die (L1) has a die surface (L1A) conforming to the contour of back side of resulting foam padding (10).

In operation, the upper and lower foaming dies (U1)(L1) are closed tight together, as in FIG. 4, and a liquid base foaming material is injected thereinto via the hole (U1h) from the injection nozzle (N). Thereafter, the liquid foaming material is cured to form the foam padding (10) as shown in FIG. 4. It is seen that the protuberant die surface (U1A) of upper foaming die (U1) works to define a recessed portion (see 10a,10b,10c in FIG. 5) of inverted truncated pyramid shape in the center of the resulting foam padding (10). Then, the upper foaming die (U1) is raised upward from the lower foaming die (L1). In this regard, it is appreciated that the upper foaming die (U1) can be easily and smoothly removed from the padding (10) as indicated by the two-dot chain line in FIG. 4, because both four upwardly divergent side slopes (at $\alpha,\beta$) of the protuberant die surface (U1A) and recessed portion (at 10a,10b,10c) of resulting foam padding (10) effectively provides a smooth slidability therebetween so as to facilitate the ease of removing the protuberant die surface (U1A) from the recessed portion of padding (10). Such recessed portion of padding (10) is shown in FIG. 5 to have first and second outwardly sloped wall portions (10a)(10b) which will form the upper and lower sloped walls (12a) (12b) of armrest storage portion (12), and a flat wall portion (10d) which will form the flat bottom wall (12d) of the same storage portion (12). FIG. 5 shows only one lateral sloped wall portion (10c) in that recessed portion, but it is understood that another same lateral sloped wall portion is defined therein in an opposed relation with the former one (10c). Finally, the resulting foam padding (10) is taken out from the lower foaming die (L1).

Next, referring to FIG. 5, stamping apparatus is provided to stamp and adhere one unitary sheet of covering material (11) upon the foam padding (10) thus formed. The machine includes a stationary base die member (L2) and a movable stamping die member (U2) which may be moved vertically to and from the base die member (L2). The stamping die member (U2) has a stamping die surface generally conforming to the frontal side (10F) of foam padding (10), the stamping die surface including a protuberant die surface part (U2A) of a truncated pyramid shape which generally corresponds to the likewise shaped recessed portion (at 10a, 10b, 10c, 10d) of padding (10). Preferably, the protuberant die surface part (U2A) should be slightly greater in volume than the recessed portion of padding (10) for the purpose of causing a corresponding part of covering material (11) to be evenly pressed and adhered to that particular padding recessed portion. This die surface part (U2A) is shown to have first and second sloped side die surfaces (α')(β') and flat die surface (γ'). Each of the first and second sloped side die surfaces (α') (β') is adapted to pressingly adhere the corresponding areas of covering material (11) to the first and second sloped portions (10a)(10b) of padding (10). In this respect, though not shown in FIG. 5, a third and fourth side die surface both are provided in the upper die member (U2) to pressingly adhere the corresponding areas of covering material to the two lateral sloped walls (10c) of foam padding (10) defined between the first and second sloped portion (10a)(10b) thereof. On the other hand, the base die member (L2) is adapted to receive the foam padding (10) thereon as illustrated. In practice, firstly, the back side (10B) of foam padding is secured on the base die member (L2), exposing the frontal side (10A) of same padding. Then, an adhesive (17) is applied on the reverse side of covering material (11), (or, the adhesive (17) may be applied on the frontal side (10F) of padding (10) instead), and the covering material (11) is placed on the frontal side (10F) of the padding (10) secured on the base die member (L2). The stamping die member (U2) is then lowered in the direction of arrow (①) to press and stamp the covering material (11) on and along the uneven frontal side (10F) of padding (10) so that the covering material (11) is stretched and adhered evenly to the recessed portion and other surrounding areas of foam padding (10), as indicated by the two-dot chain line in FIG. 5. Thereafter, when the stamping die member (U2) is raised in the direction of arrow (②), there is formed an adhered work of covering material (11) and padding (10), with the armrest storage portion (12) defined therein, as can be seen from the two-dot line in FIG. 5. At this stage also, as noted in the preceding foaming process, the stamping die member (U2) can be easily and smoothly removed from the armrest storage portion (12) because of the smooth slidability between the four upwardly divergent side slopes of the protuberant die surface part (U2A) and armrest storage portion (12). After having taken out the thus-adhered work from the base die member (L2), the seat back frame (13), support bracket (14) and back board (15) are attached thereto as shown in FIGS. 1, 2 and 3.

FIGS. 6 and 7 show an example for using another covering material (11') having a recessed portion (11'A) preformed in conformity with the armrest storage portion (12). The recessed portion (11'A) is formed by sewing together five material sections in a shape conforming to the truncated pyramid shape of armrest storage portion (12), though not clearly shown. As seen in FIG. 7, several sewn connecting portions (Q) are formed among the five material sections, projecting a little outwardly. This sort of covering material per se is widely used in automotive seats, and the present invention permits for smooth adhering of such covering material (11') to the foam padding (10) by giving a slight, non-distinctive modification to both foaming and stamping apparatuses stated above. Thus, the method and seat back formed thereby in this particular mode are basically identical to those described in the first mode shown in FIGS. 4 and 7, except only for the projections (P1,P2)(P'1, P'2) formed in the upper foaming die (U1) and stamping die member (U2). Therefore, all like designations hereinafter correspond to all like designations given heretofore, and same description will not be repeated about the common elements and processes between the previously described mode and the present mode to be set forth below. FIGS. 6 and 7 show the same foaming and stamping processes with those shown in FIGS. 4 and 5, respectively, and thus, any further explanation will not be made thereon for the sake of simplicity.

Referring now to FIG. 6, the upper foaming die (U1) includes first and second projections (P1)(P2) formed in its protuberant die surface part (U1'A). Though not clearly shown, it is understood that the first projection (P1) is formed along the foot of the protuberant die surface part (U1'A) and the second projection (P2) formed along the peripheral corner of flat top of the same die surface part (U1'A). Accordingly, subsequent to the foaming process shown in FIG. 6, the resulting foam padding (10) is formed with slits (10R) as shown in FIG. 7. The stamping die member (U2) is shown in the FIG. 7 to have first and second projections (P'1)(P'2) formed in its protuberant die surface part (U2'A). Though not clearly shown, it is understood that the first projection (P'1) is formed along the foot of the protuberant die surface part (U2'A) and the second projection (P'2) formed along the peripheral corner of flat top of the same die surface part (U2'A). Next, the foregoing covering material (11'), after applied with the adhesive (17), is pressed and adhered to the foam padding (10) in the stamping process shown in FIG. 7. It is appreciated that the projections (Q) of covering material (11') are assuredly inserted by the first and second projections (P'1)(P'2) into the padding slits (10R) as indicated by the two-dot line, and therefore, the covering material (11') and its sewn recessed portion (11'A) are evenly and neatly adhered on the corresponding surfaces and recessed portion (at 10a,10b,10c, 10d) of padding (10), respectively.

It is therefore appreciated that the sloped walls of foam padding and sloped die surfaces are effectively cooperate with one another to realize an even stretching and adhering of the covering material on the foam padding and its recessed portion, without the floating or wrinkle problem as found in the prior art.

While having described the present invention thus far, it should be understood that the invention is not limited to the illustrated embodiments, but any other modifications, replacements and additions may be applied thereto without departing from the scopes of the appended claims.

What is claimed is:

1. A method for forming a structure of seat back with an armrest in which an armrest storage portion is defined for allowing the armrest to be stored therein, said method comprising the steps of:

providing a foaming die means including die surfaces conforming to a predetermined configuration of said seat back, said die surfaces having a protuberant die surface part, wherein said protuberant die surface part has at least two sloped die surfaces each of which slope in a single respective plane in a direction toward each other as extended to a top of the protuberant die surface;

injecting a liquid base foaming material into said foaming die means;

curing said liquid base foaming material along said die surfaces of said foaming die means to form a foam padding in said predetermined configuration of seat back, so that a recessed portion is defined in one side of said foam padding along said protuberant die surface part in such a manner as to form a first two sloped walls each in a single respective plane in said recessed portion of said foam padding, so that the recessed portion opens outwardly in a constant divergent fashion;

thereafter, taking out said foam padding from said foaming die means;

providing a covering material;

providing stamping means for adhesively engaging said cover material to said foam padding;

said stamping means including stamping die surfaces conforming to said predetermined configuration of seat back, said stamping die surfaces having a protuberant die surface part, wherein said protuberant die surface part generally conforms to said recessed portion of said foam padding and has at least two sloped die surfaces each corresponding respectively to said first two sloped walls;

setting said foam padding and said covering material in said stamping means with an adhesive included between said covering material and said foam padding;

operating said stamping means to press the stamping die surface thereof against said covering material, thereby causing said covering material to be adhered by said adhesive on and along said recessed portion and other surfaces of said foam padding, so as to form an adhered work of said covering material and foam padding which has an armrest storage portion with at least a second two sloped walls each in a single respective plane defined therein, said second two sloped walls comprising a first sloped wall with which a free end portion of said armrest is to be frictionally contacted and a second sloped wall with which a base end portion of said armrest is frictionally contacted;

removing said stamping die surface from said adhered works, the covering material and foam padding;

taking out said adhered work from each stamping means; and attaching a seat back frame and a bracket into said adhered work, while securing the armrest rotatably by said bracket in said armrest storage portion, whereby a structure of said back is formed, in which the armrest storage portion opens outwardly in a constant divergent fashion, allowing the armrest to be retained frictionally therein and released therefrom.

2. The structure of seat back according to claim 1 wherein said first sloped wall and said second sloped wall of said armrest storage portion may be of a proper outward angle within 5 to 20 degrees in relation to a line perpendicular to a flat bottom wall of the armrest storage portion.

3. The method as defined in claim 1, wherein said covering material has a recessed portion preformed by sewing together a plurality of separate covering material sections in a shape generally conforming to said recessed portion of said foam padding, with plural sewn connecting portions thereof projecting outwardly therefrom, wherein said protuberant die surface part of said foaming die means is formed with plural projections, wherein, at said step of curing said liquid base foaming material, a recessed portion is defined in said one side of said foam padding along said protuberant die surface part of said foaming die in a manner as to form said first two sloped walls in said recessed portion of said foam padding and plural slits, and wherein said protuberant die surface part of said stamping means has plural projections formed therein, wherein, at said step of operating said stamping means, said covering material is caused to be adhered on by said adhesive and along said recessed portion and other surfaces of said foam padding, with said sewn connecting portions of said covering material being inserted in said plural slits of said foam padding.

4. A structure of seat back formed by the method defined in claim 3, wherein said armrest storage portion has a flat bottom wall in addition to said second two sloped walls, wherein said second sloped walls diverge outwardly from each other in relation to said flat bottom wall.

5. The method as defined in claim 1, wherein said armrest storage portion has a flat bottom wall in addition to said second two sloped walls, and wherein said first sloped wall and second sloped wall comprising said second two sloped walls diverge outwardly from each other in relation to said flat bottom wall.

6. The method as defined in claim 1, wherein said adhesive is located on said covering material.

7. A method for forming a structure of seat back with an armrest in which an armrest storage portion is defined for allowing the armrest to be stored therein, said method comprising the steps of:

providing a foaming die means including die surfaces conforming to a predetermined configuration of said seat back, said die surfaces having a protuberant die surface part, wherein said protuberant die surface part has a flat die surface and four sloped die surfaces sloping toward said flat die surface to generally assume a truncated pyramid shape;

injecting a liquid base foaming material into said foaming die means;

curing said liquid base foaming material along said die surfaces of said foaming die means to form a foam padding in said predetermined configuration of seat back, so that a generally truncated pyramid shape of recessed portion is defined in one side of said foam padding along said protuberant die surface part in such a manner as to form four sloped walls in said recessed portion of said foam padding, so that said generally truncated pyramid shape of recessed portion opens outwardly in a constant divergent fashion;

thereafter, taking out said foam padding from said foaming die means;

providing a covering material;

providing a stamping means for adhesively engaging said cover material to said foam padding;

said stamping means including stamping die surfaces conforming to said predetermined configuration of seat back, said stamping die surfaces having a protuberant die surface part, wherein said protuberant die surface part is of a truncated pyramid shape generally conforming to said generally truncated pyramid shape of the recessed portion of said foam padding and has four sloped die surfaces each corresponding respectively to said four sloped walls;

setting said foam padding and said cover material in said stamping means with an adhesive between said cover material and said foam padding;

operating said stamping means to press the stamping die surface thereof against said covering material, thereby causing said covering material to be adhered by said adhesive on and along said generally truncated pyramid shape of recessed portion and other surfaces of said foam padding, so as to form an adhered work of said covering material and foam padding which has an armrest storage portion with four covered sloped walls defined therein, said four covered sloped walls comprising a first sloped wall with which a free end portion of said armrest is to be frictionally contacted; a second sloped wall with which a base end portion of said armrest is frictionally contacted; and pair of third sloped walls with which two lateral portions of said armrest are to be frictionally contacted, respectively;

removing said stamping die surfaces from said adhered work of the covering material and foam padding;

taking out said adhered work from said stamping means; and attaching a seat back frame and a bracket into said adhered work, while securing the armrest rotatably by said bracket in said armrest storage portion, whereby a structure of seat back is formed, in which the armrest storage portion opens outwardly in a constant divergent fashion, allowing the armrest to be retained frictionally therein and released therefrom.

8. The method as defined in claim 7, wherein said armrest storage portion has a flat bottom wall in addition to said first sloped wall, said second sloped wall and said pair of third sloped walls and wherein said first sloped wall, second sloped walls and said pair of third sloped walls diverge outwardly from one another in relation to said flat bottom wall.

9. The structure of seat back according to claim 8, wherein each of said first sloped wall and second sloped wall may be of a proper outward angle within 7 to 20 degrees in relation to a line perpendicular to said flat bottom wall, and wherein said pair of third sloped walls may each be of a proper outward angle within 5 to 10 degrees in relation to a line perpendicular to the flat bottom wall.

10. The method as defined in claim 7, wherein said adhesive is located on said covering material.

* * * * *